United States Patent
Mauchle et al.

(10) Patent No.: US 8,601,977 B2
(45) Date of Patent: Dec. 10, 2013

(54) SPRAY COATING CONTROL DEVICE

(75) Inventors: Felix Mauchle, Abtwil (CH); Christian Marxer, Fuerstentum (LI)

(73) Assignee: ITW Gema GmbH, St. Gallen (CH)

( * ) Notice: Subject to any disclaimer, the term of this patent is extended or adjusted under 35 U.S.C. 154(b) by 852 days.

(21) Appl. No.: 11/817,895

(22) PCT Filed: Mar. 6, 2006

(86) PCT No.: PCT/IB2006/000480
§ 371 (c)(1), (2), (4) Date: Jan. 2, 2008

(87) PCT Pub. No.: WO2006/095237
PCT Pub. Date: Sep. 14, 2006

(65) Prior Publication Data
US 2008/0190366 A1    Aug. 14, 2008

(30) Foreign Application Priority Data
Mar. 7, 2005   (DE) .......................... 10 2005 010 835

(51) Int. Cl.
*B05C 5/02*      (2006.01)

(52) U.S. Cl.
USPC ........... 118/695; 118/696; 118/629; 118/308; 700/283

(58) Field of Classification Search
USPC .............. 118/690–696, 308, 629; 700/17, 83, 700/179, 180, 240, 169, 282, 247
See application file for complete search history.

(56) References Cited

U.S. PATENT DOCUMENTS

| | | | |
|---|---|---|---|
| 4,324,316 A | 4/1982 | Thrasher, Jr. et al. | |
| 4,941,778 A | 7/1990 | Lehmann | |
| 6,059,884 A | 5/2000 | Seitz et al. | |
| 6,379,465 B1 | 4/2002 | Perkins et al. | |
| 6,383,572 B1 * | 5/2002 | De Graaf et al. | 427/427.2 |
| 2001/0002637 A1 * | 6/2001 | Hani et al. | 187/391 |
| 2003/0232125 A1 * | 12/2003 | Ziwica et al. | 427/8 |

FOREIGN PATENT DOCUMENTS

| | | | |
|---|---|---|---|
| EP | 0899018 A1 | | 3/1999 |
| EP | 1084756 A2 | * | 3/2001 |
| TW | 250045 B | | 3/2006 |
| WO | 2005018825 A1 | | 3/2005 |

OTHER PUBLICATIONS

International Search Report of Application No. PCT/IB2006/000480 mailed Jul. 13, 2006.
ITW GEMA AG: "OptiStar CGO7 Gun Control Unit-Operating instructions and spare parts list" [Online] 2005, XP002387489 Retrieved from the internet: URL:http://www.itwfinishing.com.au/docs/document_43edc79a344cf.pdf>.
ITW GEMA AG: "OptiBasic" [Online] 2004, XP002387490 Retrieved from the internet: URL:http://www.itwgema.com/pdflibrary/OptiBasicBro.pdf>.
Office Action for CA2594811 mailed Oct. 25, 2011.

* cited by examiner

*Primary Examiner* — Laura Edwards
(74) *Attorney, Agent, or Firm* — Lowe Hauptman & Ham, LLP

(57) ABSTRACT

An electronic spraycoating control device for implementing spraycoating methods includes at least one manually driven program selecting element for selecting programs from two different groups of programs. The electronic spraycoating control device further includes a plurality of manually driven parameter setting elements and display units to automatically display the adjusted parameter references values.

14 Claims, 3 Drawing Sheets

SPRAY COATING CONTROL DEVICE

RELATED APPLICATIONS

The present application is based on International Application Number PCT/IB2006/000480 filed Mar. 6, 2006, and claims priority from, German Application Number 10 2005 010 835.0, filed Mar. 7, 2005, the disclosures of which are hereby incorporated by reference herein in their entirety.

BACKGROUND

The present invention relates to an electronic spraycoating control device with which to implement spraycoating procedures.

The control device controls spray units which spray coating materials onto objects to be coated. The coating material may be a liquid, for instance a paint or the like, or preferably a coating powder. The coating material is sprayed on an object to be coated and then is permanently bonded to it by heating it. There are spray units with or without high voltage electrodes to electrostatically charge the coating material. Furthermore there are tribo-electric spray units for coating powders wherein the coating powder is charged by its friction against a duct wall. The spray units may be manually operated (manual guns) or they may rest on a support (automated guns). They are also called manual guns in the first above case and automated guns in the second one even when they are not gun-shaped but for instance are tubular or in the form of a block fitted with several nozzle apertures.

STATE OF THE ART

U.S. Pat. No. 4,324,361 shows an electrostatic spray unit to spray coating powder onto objects. The unit comprises high voltage electrodes to electrostatically charge the coating material, an air duct for compressed air enhancing coating powder atomization, and a pressurized duct to produce an air envelope around the atomized powder cloud. The air envelope also may be used to impart a specific shape to the powder cloud. In the later case this kind of pressurized air is also called "shaping air". U.S. Pat. No. 4,289,278 shows an electrostatic powder spraycoating device fitted with an electrode in a compressed air duct. U.S. Pat. No. 4,090,666 discloses a spray unit wherein the coating powder is charged tribo-electrically. U.S. Pat. No. 4,941,778 shows a spraycoating unit with an electronic control. U.S. Pat. No. 4,357,900 discloses spraycoating equipment comprising several spray units in the form of automated guns and with several electronic controls. The European patent documents EP 0 706 102 B1 and 0 899 018 B1 show a superposed control to which are hooked up several control implements each of which is connected to at least one spray unit.

Heretofore different control devices have been conventionally used for automated spray units (automated guns) and for manual spray units (manual guns). However the control implements for automated spray units also may be used for manual spray units. But both coating quality and efficiency are very much affected by operator experience as regards manual spray units. Therefore, unlike the control devices for automated spray units, the manual spray unit control devices contain spraycoating programs not only having variable parameters, but also having fixed parameters. The said fixed parameters are those especially critical for coating quality and/or efficiency and requiring much experience when setting parameter values, for instance the voltage of high voltage electrodes used in electro-statically charging the coating material, and preferably also the electrode current. The fixed parameters are set at values that were empirically found to be especially advantageous. Such a feature however entails the drawback that the customer needs at least two different control devices.

The objective of the present invention is to offer an engineering solution whereby customer operation of spraycoating shall be simpler and more economical while retaining good coating quality and high coating efficiency.

BRIEF DESCRIPTION OF THE DRAWINGS

The invention is elucidated below in relation to the drawings and for preferred, illustrative implementations.

DETAILED DESCRIPTION

Figure 1:
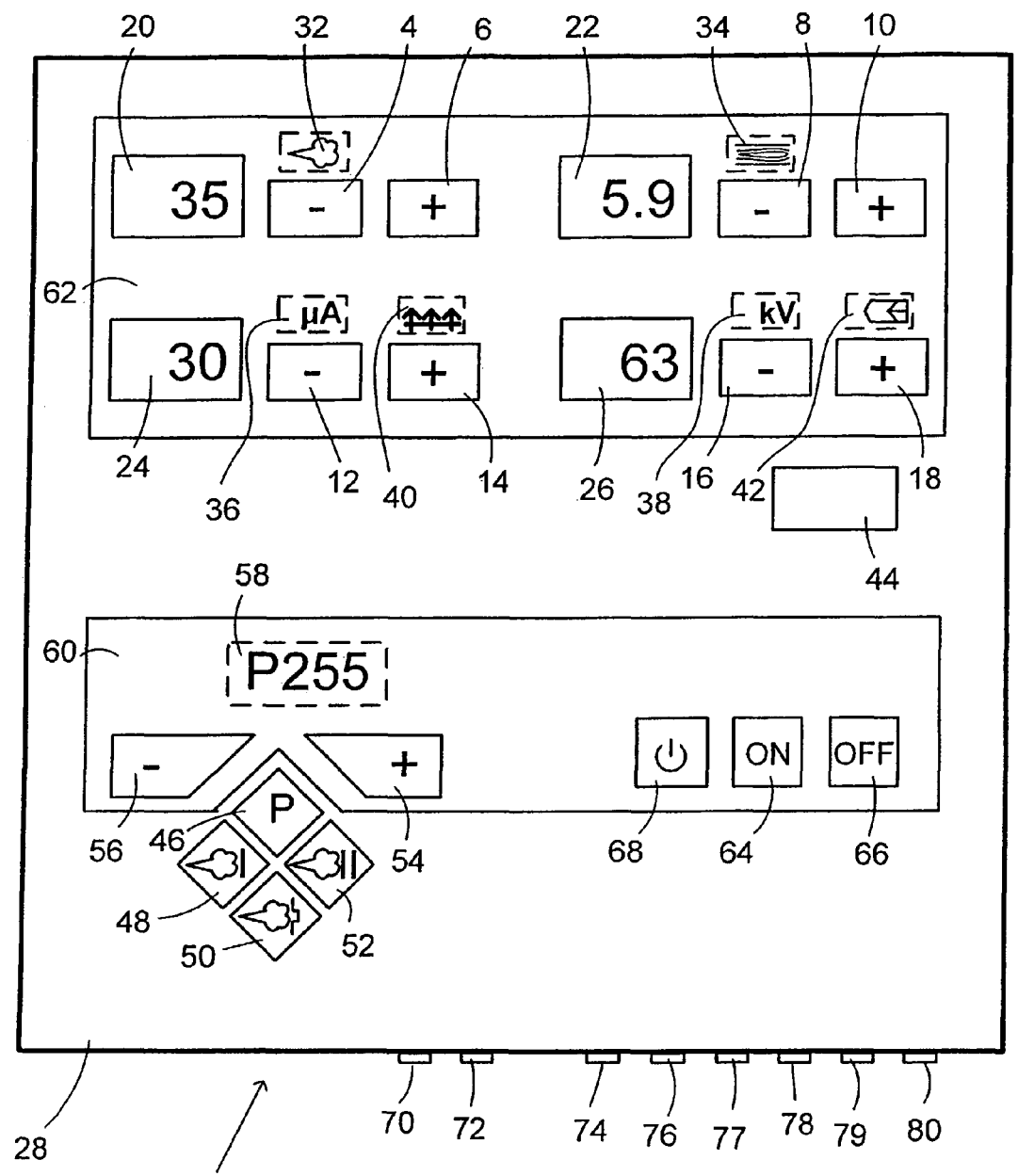
FIG. 1 is a schematic front view of an electronic spraycoating control device of the invention to implement spraycoating methods, FIG. 2 schematically shows a spraycoating unit fitted with a control device of the invention, and FIG. 3 schematically shows a spraycoating facility fitted with at least one control device of the invention.

To implement spraycoating methods, the spraycoating control device 2 of the invention shown in FIG. 1 contains a plurality of programs from a first group of programs each containing several adjustable parameters; further manually driven parameter setting elements 4, 6, 8, 10, 12, 14, 16 and 18 to set parameter reference values; and optical parameter display units 20, 22, 24, 26 to automatically display the set parameter reference values and the actual parameter values.

Preferably the parameter setting elements 4 through 18 and the display units 20 through 26 are situated all in the same operational pane 28 of the control device 2.

Preferably notations or symbols of the parameters are situated in the operating pane 28, for instance in the form of a cloud symbol 32 for the rate of coating powder fed to a spray unit (spray gun); a symbol 34, for an object in a flow of air, as the notation for the total quantity of air, where coating powder is automatically fed to a spray unit; a symbol 36 in the form of the letters μA for the electrode spray current from one or more high voltage electrodes of the spray unit; a symbol 38 in the form of the letters kV for the voltage at the minimum of one high voltage electrode; a symbol 40 having one or several upward-pointing arrows on a cross bar for the rate of fluidizing compressed air flowing into a container to loosen coating powder therein or to fluidize it; and a symbol 42, in the form of an arrow within a rectangle, for electrode rinsing air to rinse the high voltage electrode with compressed air. Obviously other or additional parameters may be provided, for instance compressed shaping air to shape the coating cloud sprayed by the spray unit.

Preferably the parameter setting elements are keys, preferably mechanical, pressure-responsive keys. In other embodiment modes, said keys also may be capacitive or inductive or touch-sensitive keys. The embodiment mode of FIG. 1 comprises two such key-like setting elements 4,6; 8,10; 12,14; 16,18 for each parameter, in every case one setting element being denoted by a minus sign and the other by a plus sign. Actuating the plus sign setting element raises the particular parameter value and actuating the minus sign setting element lowers it. One of the display units 20, 22, 24 or 26 is associated with the minus and plus signs of the same parameter. Preferably said display units are luminous, preferably multi-segment luminous displays.

FIG. 1 shows that not only one, but two symbols 36 and 40 representing two parameters are allocated to the display unit 24 and to the two related setting elements (keys) 12 and 14. In similar manner, not only one, but two symbols 38 and 42 are allocated for two parameters to the display unit 26 and to the related two setting elements (plus and minus keys) 16, 18. At each of the two display units 24 and 26, the particular parameter of the second symbol 40 resp. 42 is stored in another memory plane than the parameter of the other symbols 32, 34, 36, 38. A toggle switch, preferably a key 44, allows particular reversals between the said planes in order to activate the particular parameters of either plane.

The control device 2 of the invention comprises, in addition to the programs of the first group of programs (not shown), also at least one, preferably several and illustratively three programs of a second group of programs (not shown) of which at least one program comprises an adjustable parameter and a fixed parameter. Moreover the invention comprises at least one program selecting element to alternatively switch ON either one program from the first group of programs or from the second group of programs. In the illustrative embodiment mode of FIG. 1, there are one program selecting element acting as the program group selecting element 46 to activate the first group of programs and three program selecting elements 48, 50 and 52 to activate each a particular program of the second group of programs, preferably in the form of keys 46, 48, 50, 52. The keys 46, 48, 50, 52 selecting a set of groups and selecting a program preferably are mechanical, pressure-responsive keys. However capacitive or inductive keys and soft-touch sensors also may be used. The first group of programs is selected by manually pushing the program group selecting element 46. A plus key 54 and a minus key 56 are associated as program switching elements to said program group selecting element. Every time the plus program switching key 54 is pushed, another program group is activated in a predetermined, ascending sequence, and every time the other program switching key 56 is pushed, another program from the first group of programs is activated in the reverse, descending order. The particular program being activated is displayed in an optical program display unit 58, for instance in the form of a program numeral. Preferably the program display unit 58 is a luminous display, preferably a seven segment luminous display.

The program selecting elements 46, 48, 50 and 52 in the form of keys are configured preferably in a rectangular array, preferably on edge, in the manner of a rhombus. The program group selecting lament 46 is configured in the upper corner and its associated two plus and minus keys 54 and 56 are mounted right and left of it. The program display unit 58 is situated above said keys 54 and 56. Illustratively the program group selecting element 46 selecting the first group of programs is denoted by the symbol "P". The program selecting elements each selecting a particular program of the second group of programs are denoted by symbols indicating the kind of spraycoating intended by their selected programs. Illustratively the program selecting element 48 is shown with a cloud and a vertical bar denoting a coating program suitable for priming or a basic coating. The symbol of the second program selecting element 50 is for a program appropriate for complexly shaped objects, for instance for multi-stepped objects. And the third program selecting element 52 of the second group is denoted by two vertical lines indicating a program that implements further, or top, coatings. These three program selecting elements 48, 50, 52 of the second group of programs also contain the symbol of a spraycoating powder cloud.

Once the first group of programs has been selected by pushing the program group selecting elements 46, the values of all parameters 32, 34, 36, 38, 40 and 42 can be set. Once a parameter value has been set, the parameter display units 20, 22, 24 and 26 each indicate the parameter reference value. In a preferred embodiment of the present invention, the control device 2 is designed in a manner that a given parameter's actual value, instead of the reference value, is indicated after a given time interval.

Pushing one of the program selecting elements 48, 50, 52, a program associated with the particular program selecting element is selected that illustratively contains the adjustable parameters 32, 34 as those that shall be set, and additionally contains at least one further parameter, for instance the parameters 36 and 38 in the form of high voltage and the current at this voltage as the fixed parameter. In other words, these two fixed parameters 36 and 38 from the second program group are adjustable parameters in the first group of parameters.

The parameters of the first group of programs and those of the second group of programs indeed are the same and they also may be set at the parameter setting elements 4, 6, 8, 10, 12, 14, 16, 18 and be indicated as well at the same parameter display units 20, 22, 24 and 26, however they may be at different values because the parameter values of the first group of programs are stored at different memory sites than the parameter values of the second group of programs.

Preferably the operations panel 28 consists of a single-layer or multi-layer planar structure. The selecting and setting elements as well as the display units preferably are integrated into the planar structure of the control panel 28. This control and display panel 28 is sub-divided into a programming area 60 and a parameter area 62 which can be distinguished visually. The parameter area 62 is situated above the programming area 60. The switching key 44 is positioned between said two areas 60 and 62. All the program selecting elements 46, 48, 50, 52, 54, 56 and the program display unit 58 are configured in the programming area 60. The programming area 60 may be extended laterally to further include an ON-switching element 64 and an OFF-switching element 66, that preferably shall also be keys, preferably also a special key 68 for special function. The parameter display units 20, 22, 24 and 26, further the parameter setting elements 4, 6, 8, 10, 12, 14, 16, 18 and the parameter symbols 32, 34, 36, 38, 40, 42 are situated in the parameter area 62. Preferably the parameter area 62 in turn is sub-divided into four sub-areas two of which are superposed one above the other and two of which are laterally adjoining. As a result the operating elements and the display units can be serviced easily and ergonomically.

The control device is fitted with an electric power terminal 70, and a compressed air intake 72, to receive electric power and compressed air respectively. This control device furthermore is fitted with at least one power output 74 and at least two or for instance three or four compressed air outlets 76, 77, 78, 79 80 to apply compressed air in regulated manner.

Figure 2:
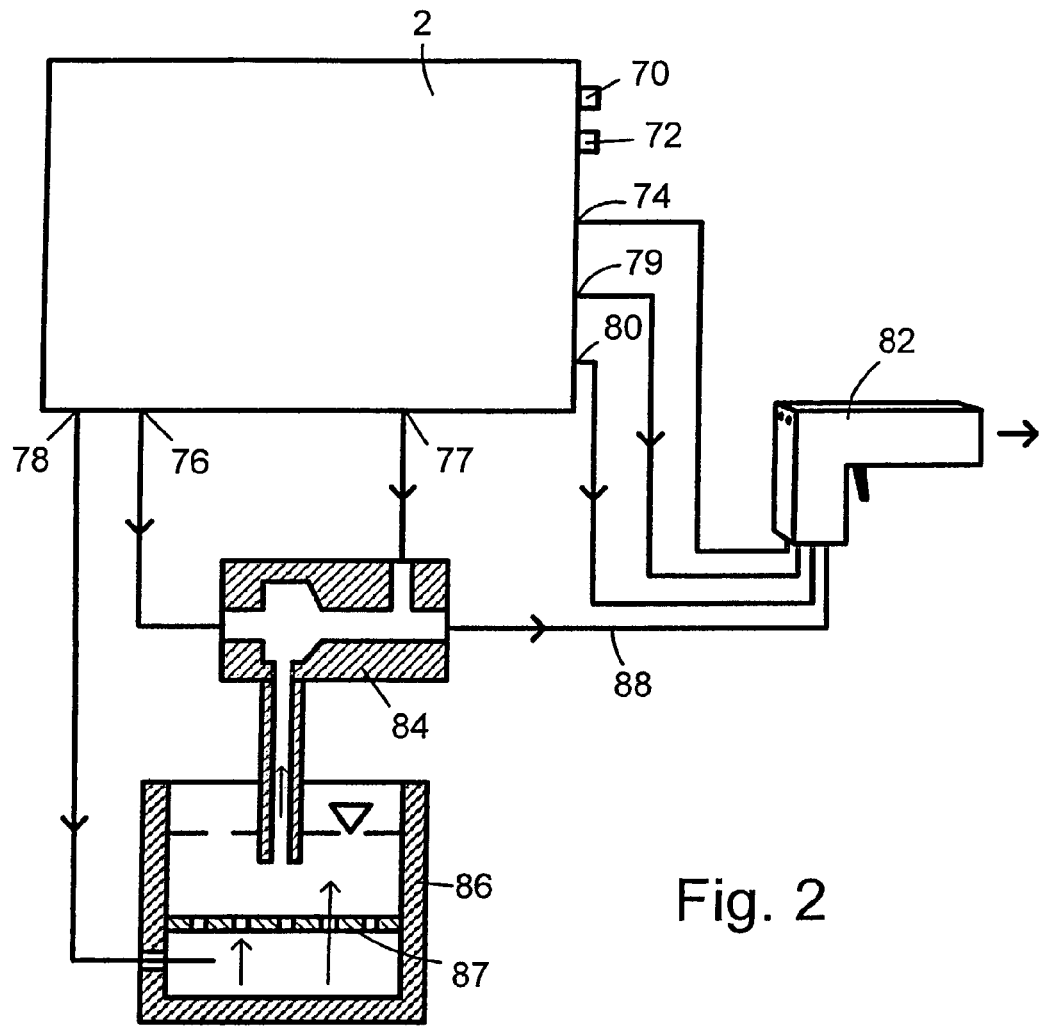

FIG. 2 schematically shows the control device of FIG. 1 being connected to a spray unit 82, an injector 84 and a powder container 86. Compressed air from the compressed air outlet 76 of the control device 2 serves as conveying air which, inside the injector 84, aspirates coating powder out of the powder container and feeds it through the powder line 88 to the spray unit 82. Within the injector 84, compressed air from the compressed air outlet 77 of the control device 2 is fed to the flow of powder and conveying air to enhance powder conveyance to the spray unit 82. Compressed air from the compressed air outlet 78 of the control device 2 flows through a perforated container base 87 and loosens or fluidizes the powder in the power container 86. Compressed air from the compressed air outlet 79 of the control device 2 illustratively is used to rinse the electrodes in the spray unit 82. Compressed air at the compressed air outlet 80 of the control device 2 illustratively serves as shaping air for the coating powder sprayed by the spray unit 82.

Figure 3:
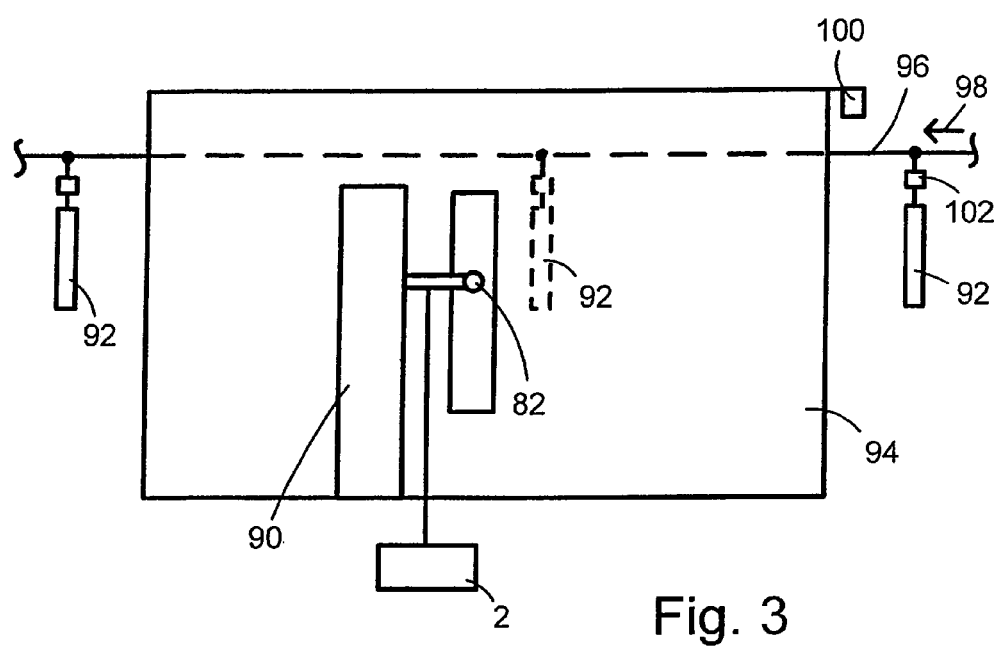

As shown in FIG. 3, the control device 2 not only may control the spray unit 82, but also a positioning means 90 for instance an adjustable stand or a robot supporting the spray unit 82 and able to point it in different directions relative to an object 92 within a spraycoating cabin 94. Several control devices 2 of the invention also may be mounted to an overhead control unit to control several spray units 82 as a function of the kind and the particular transport position of the objects 92 to be coated relative to the spraycoating cabin 94. FIG. 3 schematically shows a transportation system 96 moving the objects 92 to be coated through the spraycoating cabin in the direction 98. The spraycoating cabin 94 may be fitted with an object recognizing sensor 100. The objects 92 to be coated may be fitted with an identifying tag 102.

The invention claimed is:

1. An electronic spraycoating control device for controlling a spraycoating operation of a spraycoating unit, the device comprising:
    a plurality of spray coating programs divided into a first group of programs and a second group of programs, each program from the first group of programs and from the second group of programs having a plurality of adjustable parameters of the spraycoating operation;
    a first program selecting element for selecting the first group of programs;
    at least one second program selecting element different from the first program selecting element and for selecting the second group of programs;
    manually driven parameter setting elements different from the first and the second program selecting elements and for setting parameter reference values for the adjustable parameters of the first and second groups of programs;
    optical display units associated with the first and the second groups of programs to automatically display the set parameter reference values;
    at least one program from the second group of programs being selectable, by activation of the at least one second program selecting element, and including at least one adjustable parameter of the first group of programs and at least one fixed parameter of the second group of programs, wherein the at least one fixed parameter from the second group of programs is one of the adjustable parameters from the first group of programs;
    two program switching elements configured such that each actuation of one of the two program switching elements activates another program from the first group of programs in an ascending sequence, and each actuation of the other program switching element activates yet another program from the first group of programs in a reverse sequence; and
    an optical display configured to display an identification of the currently activated program from the first group of programs,
    wherein the at least one adjustable parameter is selected from the group consisting of a rate of coating powder fed to a spray gun, an electrode spray current, and a rate of compressed air supplied to fluidize the coating powder in the supply container.

2. A control device as claimed in claim 1, further comprising:
    memory locations for storing the parameter reference values for the adjustable parameters of the first group of programs separate from the parameter reference values for the adjustable parameter of the second group of programs;
    wherein the at least one adjustable parameter of the second group of programs is another first adjustable parameter from the first group of programs; and
    wherein the parameter reference values for the adjustable parameters of the second group of programs is settable at the same parameter setting elements of the particular parameters as the parameter reference values for the adjustable parameters of the first group of programs and is displayable at same related display units of the particular parameters as the parameter reference values of the adjustable parameters of the first group of programs, and
    a reference value or actual value of the at least one fixed parameter of the second group of programs is displayable at at least one of the same related display units of said one of the adjustable parameters of the first group of programs whenever a program from the second group of programs is selected.

3. A control device as claimed in claim 1, comprising multiple said second program selecting elements each configured to activate the respective program from the second group of programs and deactivate the currently activated program regardless of whether the currently activated program is a program from the second group of programs or a program from the first group of programs.

4. A control device as claimed in claim 1, wherein the program selecting elements include at least a mechanical, pressure-responsive key.

5. A control device as claimed in claim 1, wherein the parameter setting elements include mechanical, pressure-responsive keys.

6. A control device as claimed in claim 1, further comprising:
    optically recognizable parameter symbols disposed at or adjacent to the parameter setting elements to symbolize the nature of the parameters, said parameter symbols comprising self-luminous or illuminated parameter symbols.

7. A control device as claimed in claim 2, wherein at least one of the adjustable parameters for the first and second groups of programs is stored in one of the memory locations which is alternatively activated and different than the other parameters.

8. A control device as claimed in claim 1, comprising multiple said optical display units which are luminous displays, having multi-segment light display elements.

9. A control device as claimed in claim 1, wherein the parameter setting elements, the at least one optical display unit, and the program selecting elements are integrated in a single planar operating panel.

10. A control device as claimed in claim 9, wherein
    the operating panel is sub-divided into two optically recognizable areas including a program and a parameter the program selecting elements are disposed in the program area, and
    all parameter setting elements and the at least one optical display unit are configured in the parameter area.

11. A control device as claimed in claim 1, wherein upon parameter activation, the at least one optical display unit is configured to first automatically display its reference value and, after a predetermined time interval, automatically switch to displaying the activated parameter's actual value.

12. A control device as claimed in claim 1, wherein
the first program selecting element for selecting the first group of programs is positioned between the two program switching elements.

13. An electronic spraycoating control device for controlling a spraycoating operation of a spraycoating unit, the device comprising:

a plurality of spray coating programs all sharing a same set of parameters of the spraycoating operation;

different said programs having different sets of preset values for said parameters;

said plurality of spray coating programs being divided into a first group of programs and a second group of programs;

the preset values of the parameters of each program from the first group of programs being adjustable;

at least one of the preset values of the parameters of each program from the second group of programs being fixed and not adjustable;

a first program selecting element for selecting the first group of programs;

multiple second program selecting elements different from the first program selecting element;

manually driven parameter setting elements different from the program selecting elements and for adjusting the adjustable preset values of the parameters of a currently selected program; and multiple optical display units each for displaying the preset or adjusted value of one of the parameters of the currently selected program, wherein the at least one adjustable parameter is selected from the group consisting of a rate of coating powder fed to a spray gun, an electrode spray current, and a rate of compressed air supplied to fluidize the coating powder in the supply container.

14. A control device as claimed in claim 13, further comprising:

two program switching elements configured such that each actuation of one of the two program switching elements activates another program from the first group of programs in an ascending sequence, and each actuation of the other program switching element activates yet another program from the first group of programs in a reverse sequence, and an optical display different from said multiple optical display units and for displaying an identification of the currently activated program from the first group of programs.

* * * * *